Aug. 12, 1969   J. A. E. HABERKORN   3,460,783
APPARATUS FOR POSITIONING OF THE THRUST ENGINES OF A VERTICAL
TAKE-OFF AND LANDING AIRCRAFT
Filed Aug. 9, 1967   2 Sheets-Sheet 1
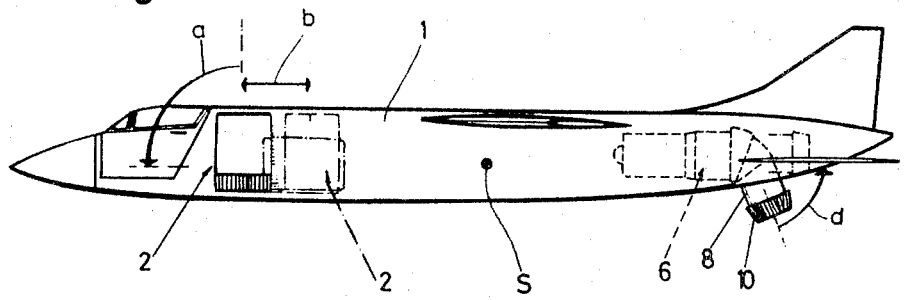
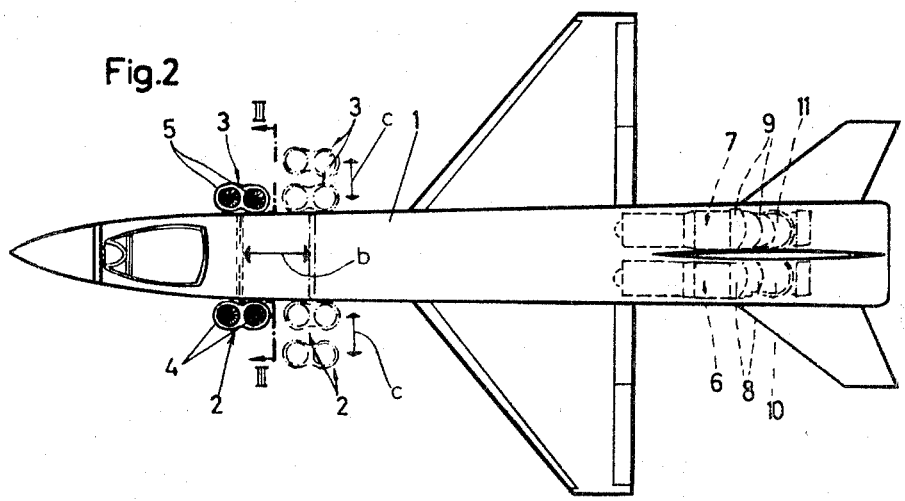
INVENTOR
JOSEPH A. ERICH HABERKORN
BY
*William K. Serys*
ATTORNEY

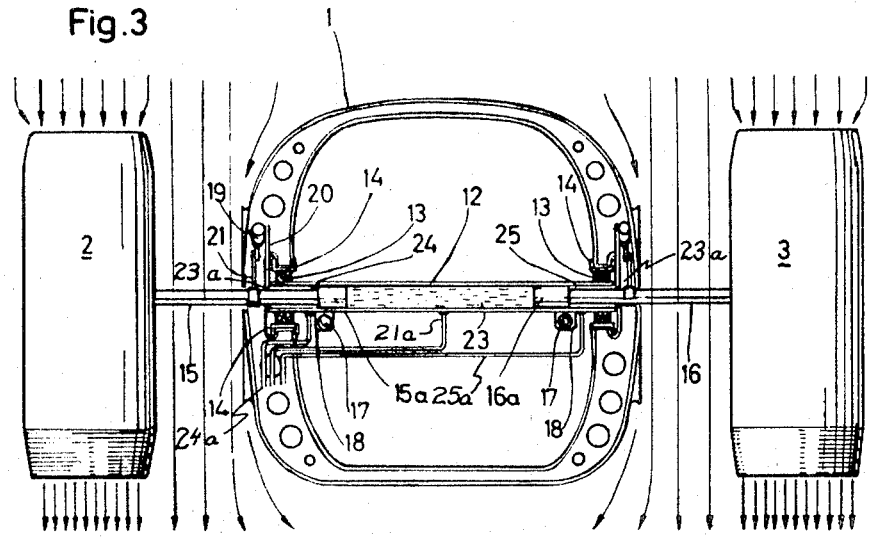
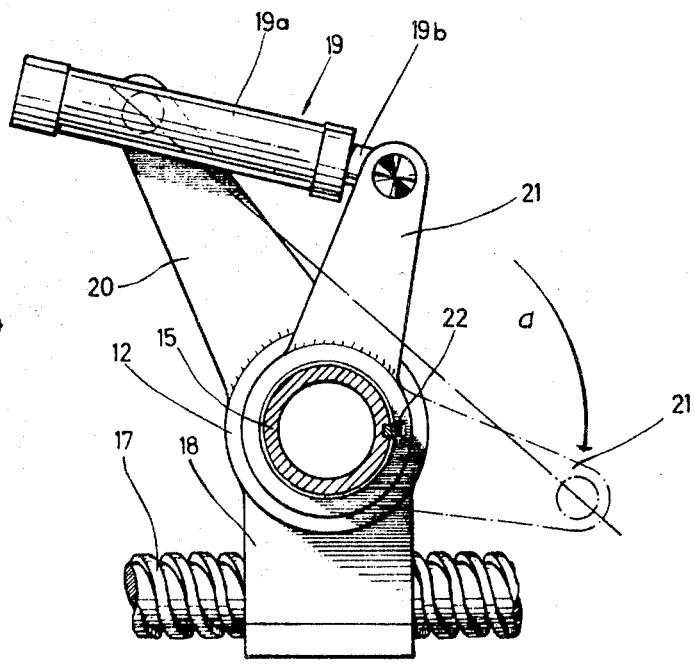

3,460,783
APPARATUS FOR POSITIONING OF THE THRUST ENGINES OF A VERTICAL TAKE-OFF AND LANDING AIRCRAFT
Joseph A. Erich Haberkorn, Riemerling, Germany, assignor to Bolkow G.m.b.H., Ottobrunn, Germany
Filed Aug. 9, 1967, Ser. No. 659,354
Claims priority, application Germany, Aug. 11, 1966, B 88,427
Int. Cl. B64c *15/12, 29/00*
U.S. Cl. 244—56                                   8 Claims

ABSTRACT OF THE DISCLOSURE

The embodiment illustrated includes apparatus for selectively positioning in three geometric planes the four forward jet engines of a vertical take-off and landing aircraft. Each pair of forward engines is mounted upon one end of a pair of support rods, the remaining ends of which are coaxially positioned within a cylindrical sleeve which passes through the nacelle of the aircraft. Pressurized fluid is selectively introduced into the sleeve so as to cause axial sliding movement of the rods with respect thereto so as to permit positioning of the engines along a plane transverse to the longitudinal axis of the fuselage. Serving to provide movement of the engines along a plane parallel to the fuselage is means for shifting the sleeve along the longitudinal axis of the fuselage. The angle of intersection between the longitudinal axis of the fuselage and the axis of the forward engines is selectively determined by a hydraulic actuator which causes rotary movement of the support rods and thus the engines with respect to the fuselage.

---

This invention generally relates to a vertical take-off and landing aircraft and more particularly relates to an apparatus for selectively positioning the engines of such an aircraft with respect to the fuselage thereof.

Conventional vertical take-off and landing aircraft usually include engines mounted at the sides of the fuselage or at the wing tips. Means is frequently provided for swiveling the engines about the pitch axis or about an axis parallel to the pitch axis of the plane. In connection with such arrangements, the engines, during take-off and landing, are rotated so that the exhaust jets are directed to oppose gravitational pull. After take-off, the engines are rotated to a position in which their axes are substantially parallel to the center line of the aircraft fuselage. They remain in this position during cruise flight.

Frequently such aircraft include additional stern engines rigidly mounted with axes parallel to the roll axis of the aircraft. The stern engines often include deflection apparatus for deflecting the exhaust jets in a downward, i.e. substantially vertical, direction against gravitational pull during take-off and landing. In this regard the deflection apparatus usually includes a short piece of pipe, the exhaust orifice of which is directed downward. A tiltable deflection nozzle is secured to the end of this vertical exhaust pipe to permit a degree of selection of the direction of the force vector of the exhaust jet during transitional flight, i.e., vertical to horizontal flight. In one prior arrangement, the exhaust jet is directed by selectively positionable flaps which, during vertical flight, obstruct the vertical exhaust pipe and direct the gas flow into a horizontal exhaust pipe.

Stable vertical flight is obtained only if the sum of all moments about the center of gravity of the aircraft is zero. Since there is a lack of aerodynamic forces or only minimal aerodynamic forces acting on control surfaces of the aircraft during such vertical flight, the maintenance of the equilibrium during vertical and transitional flight is conventionally maintained by adjusting the intensity of the jet exhaust. It will be appreciated that stability is maintained in such instances by varying the force of the exhaust jets of the several engines participating in vertical flight control so as to balance the force moments acting about the center of gravity of the aircraft. Such thrust control during vertical flight is often referred to as thrust or lift modulation. A particular drawback with such systems of control is that the maximum force of all the exhaust jets is not fully utilized. This particular situation is apparent with respect to aircraft having rigidly mounted lift engines in the forward portion of the fuselage and one or more engines having afterburners and thrust deflection devices in the stern of the aircraft. In such situations, the lift engines in the front or rear portion of the fuselage are operated at reduced effectiveness in order to avoid unbalanced moments effective around the pitch axis of the craft.

A main object of this invention is to provide a means for permitting full utilization of the jet engines of a vertical take-off and landing aircraft under a wide range of operating conditions. A more particular object is to provide an apparatus for positioning the jet engines of a vertical take-off and landing aircraft so as to facilitate balancing of the moments about the pitch axis of the craft. Other objects and advantages of the invention will become apparent through reference to the following description and accompanying drawing which shows an illustrative embodiment of this invention, in which:

FIGURE 1 is a side view of an aircraft embodying certain features of this invention.

FIGURE 2 is a top view of the aircraft illustrated in FIGURE 1.

FIGURE 3 is an enlarged sectional view taken along the line III—III of FIGURE 2.

FIGURE 4 is an enlarged fragmentary view of a portion of the apparatus illustrated in FIGURE 3.

Briefly, the illustrated embodiment is particularly adapted for use with vertical take-off and landing aircraft provided with jet engines mounted at the stern of the fuselage that is behind the center of gravity of the craft in the direction of cruise flight and also with engines mounted in the front portion of the craft forward of the center of gravity. To facilitate full utilization of the capacity of all engines during vertical flight while balancing moments about the center of gravity of the craft, means is provided for positioning the forward engines along the longitudinal axis of the craft so as to vary the moment arm through which the jet forces act with respect to the plane's center of gravity. Additional means is included for rotating the forward engines about an axis parallel to the pitch axis of the aircraft so as to permit utilization of the forward engines for cruise and transitional flight as well as vertical lift.

The illustrated embodiment not only facilitates use of the forward engines for cruise as well as lift and enables adjustment of the moments about the aircraft's center of gravity, but also increases the effectiveness of the forward exhaust jet and decreases the recirculation gases and the ground suction. In this connection, the illustrated embodiment affords means for adjusting the lateral displacement of the forward engines so as to effect a better cold air supply to the engines. Furthermore, as will hereinafter be described, the lateral displacement of the forward engines from the fuselage provides an improvement of the air intake conditions of the engines during cruise flight. Their location can be adjusted both longitudinally and transversely to the roll axis of the fuselage. Thus, the aerodynamic flow conditions through the engines may be optimized with respect to the flight conditions.

Referring to FIGURES 1 and 2, an aircraft is illustrated having jet engine pods 2 and 3 supported at both sides of the forward section of a fuselage. Each of the engine pods 2 and 3 comprises two jet engines respectively designated 4 and 5 which may be used for lift, transitional, or curise power as desired. Serving to provide additional thrust and to counterbalance the moments about the center of gravity S created by the pods 2 and 3 are stern engines 6 and 7. The stern engines 6 and 7 are mounted in the nacelle of the aircraft and have their longitudinal axes positioned parallel to the roll axis of the aircraft. The engines 6 and 7 include afterburners 8 and 9 and tiltable exhaust pipes 10 and 11. With respect to FIGURES 1 and 2, the position of the pods 2 and 3 and the stern engines 6 and 7 relate to their positions during vertical lift, the exhaust pipes 10 and 11 in such situations being tilted downwardly. The position of the afterburners 8 and 9 during cruise flight is illustrated in phantom and their arcuate path of movement by the arrow $d$. Various displacement positions of the engine pods 2 and 3 are shown in phantom.

As previously mentioned, means are provided for rotating the pods 2 and 3 so as to facilitate their use during cruise as well as vertical flight. Upon completion of vertical lift, the pods 2 and 3 are rotated through an angle $a$ to a position wherein the longitudinal axes of the engines 4 and 5 are parallel with the roll axis of the aircraft. An arrow $b$ represents the range of displacement of the engine pods 2 and 3 along the fuselage of the craft, and an arrow $c$ designates the range of displacement of the engine pods 2 and 3 in a direction transverse to the roll axis of the craft. In accordance with the illustrated embodiment, means are provided for shifting the pods 2 and 3 along the longitudinal axis $b$, the transverse axis $c$, and the arc $a$.

Referring to FIGURE 3, a cylindrical sleeve 12 passes through the fuselage. The ends of the sleeve 12 are journaled in ring bearings 13. The inner races of the bearings 13 are fixed to the outer surface of the sleeve 12. The outer races of the bearings 13 are slideable along horizontal rails 14 mounted longitudinally of the fuselage 1, and anchored to the sidewalls thereof. Supporting the pods 2 and 3 in their respective positions are arms 15 and 16 coaxially positioned within the sleeve 12. The ends of the arms 15 and 16 which are maintained within the sleeve 12 are terminated by pistons 15a and 16a respectively. As will hereinafter be described, hydraulic fluid is introduced into the sleeve 12 resulting in axial movement of the rods.

Serving to drive the sleeve 12 along the rails 14 is a drive screw 17 threaded through a threaded support member 18. The sleeve 12 is journaled through the support member 18 and securely fixed thereto. Rotation of the drive screw 17 causes movement of the member 18 and the sleeve 12 along the rails thereby varying the distance between the pods 2 and 3 and the center of gravity S of the aircraft.

Referring to FIGURE 4, the rotational position of the engine pods 2 and 3 is facilitated by hydraulic actuators 19 secured to both sides of the fuselage 1. Each hydraulic actuator comprises a cylinder 19a wherein a piston rod 19b is slideably maintained. The cylinder 19a is pivotally supported upon one end of a lever 20 rigidly secured to the sleeve 12, while the piston rod 19b of the actuator 19 is pinned to a lever 21 which is mounted on the support arm 15 by means of a sliding key 22. The sliding key 22 prevents relative movement between the lever 21 and the piston 15a while allowing axial movement of the rod 15. As illustrated in FIGURE 3, a similar positioning apparatus is provided at the opposite side of the fuselage wall.

As shown in the illustrated embodiment, the engine pods 2 and 3 can be independently positioned by the actuator 19. In this manner, means is provided for individual displacement of the engine pods 2 and 3. This feature is particularly advantageous if unsymmetrical loads upon the aircraft during vertical flight are to be balanced with regard to the roll axis of the aircraft.

The displacement of the supporting arms 15 and 16 and the engine pods 2 and 3 in a direction transverse to the longitudinal axis of the aircraft is produced by injecting fluid through a tubing 21a from a source (not shown) into the volume 23 of the sleeve 12 between the faces of the pistons 15a and 16a. Ring seals 23a are positioned adjacent the inner wall of the sleeve 12 at the ends thereof so as to provide a seal between the sleeve 12 and the rods 15 and 16, thereby defining outer cavities 24 and 25. Inward axial movement of the supporting arms 15 and 16 and their corresponding pods 2 and 3 is obtained by injecting pressurized fluid via tubing 24a and 25a into the cavities 24 and 25. Correspondingly, extension of the engine pods 2 and 3 outwardly is obtained by pressurizing the cylinder volume 23 while simultaneously releasing the pressure within the cylinder volumes 24 and 25.

Thus, the apparatus of the illustrated embodiment enables positioning of the jet engines of a vertical take-off and landing aircraft in three geometric planes. This feature enables greater utilization of the engines during vertical, transitional, and cruise flight.

Although but one specific embodiment of this invention has been hereinafter shown and described, it will be understood that details of the construction shown may be altered without departing from the spirit of this invention as defined by the following claims.

I claim:

1. In combination with a vertical take-off and landing aircraft including a fuselage and first and necond propulsion engines, the apparatus comprising first and second support means for respectively supporting said first and second engines at opposite sides of said fuselage, longitudinal positioning means for shifting said first and second support means and correspondingly said first and second engines along a path substantially parallel to the longitudinal axis of said fuselage, transverse positioning means independently operable of said longitudinal positioning means for positioning said first and second engines along an axis transverse to the longitudinal axis of said fuselage, and rotary positioning means for selectively varying the angle between the longitudinal axes of said engines and the longitudinal axis of said fuselage, said rotary positioning means being operable independently of said longitudinal positioning means and said transverse positioning means.

2. An apparatus in accordance with claim 1 wherein said support means comprises first and second support rods and a cylindrical sleeve coaxially receiving one end of each of said rods, said sleeve passing substantially through said fuselage, the remaining ends of said first and second rods being respectively secured to said first and second engines.

3. An apparatus in accordance with claim 2 wherein said longitudinal positioning means comprises a drive screw and a threaded member secured to said sleeve said drive screw being threaded through said member so that rotary movement of said drive screw is translated to linear movement of said sleeve and correspondingly said engines along a path substantially parallel to the longitudinal axis of said fuselage.

4. An apparatus in accordance with claim 3 wherein said transverse positioning means including means for introducing pressurized fluid into selected portions of the interior of said sleeve so as to cause axial movement of the rods therein thereby causing movement of said engines along a linear path substantially transverse to the longitudinal axis of said fuselage.

5. An apparatus in accordance with claim 4 wherein said rotary positioning means for selectively varying the angle between the longitudinal axes of said engines and the longitudinal axis of said aircraft comprises means for rotating said first and second rods with respect to said cylindrical sleeve.

6. An apparatus in accordance with claim 5 wherein said rotary positioning means comprises a hydraulic actuator and an arm one end of which is fixed to at least one of said rods, said actuator being connected to the remaining end of said arm so that the linear movement of said actuator is translated to rotary motion of said rod and the engine secured thereto.

7. In combination with a vertical take-off and landing aircraft including a fuselage and first and second propulsion engines, the apparatus comprising first and second support rods and a cylindrical sleeve coaxially receiving one end of each of said rods, said sleeve passing substantially through said fuselage, the remaining ends of said first and second rods being respectively secured to said first and second engines and means for introducing pressurized fluid into selected portions of the interior of said sleeve so as to cause axial movement of the rods therein so as to cause movement of said engines along a linear path substantially transverse to the longitudinal axis of said fuselage.

8. An apparatus in accordance with claim 7 which further comprises rotary positioning means for selectively varying the angle between the longitudinal axes of said engines and the longitudinal axis of said aircraft said rotary positioning means comprising means for rotating said first and second rods with respect to said cylindrical sleeve.

References Cited

UNITED STATES PATENTS

| | | | |
|---|---|---|---|
| 2,866,608 | 12/1958 | Leonard | 244—7.2 |
| 2,926,869 | 3/1960 | Sullivan | 244—12 |
| 3,064,923 | 11/1962 | Reiniger | 244—12 |
| 3,289,980 | 12/1966 | Hill | 244—56 |

MILTON BUCHLER, Primary Examiner

J. E. PITTENGER, Assistant Examiner